Nov. 24, 1959    R. D. RUGER    2,914,017
AMPHIBIOUS VEHICLE
Filed Aug. 29, 1957

INVENTOR.
ROBERT D. RUGER
BY
*Clifford L. Sadler*
ATTORNEY

United States Patent Office 2,914,017
Patented Nov. 24, 1959

2,914,017

AMPHIBIOUS VEHICLE

Robert D. Ruger, Detroit, Mich., assignor to Curtiss-Wright Corporation, a corporation of Delaware Application April 29, 1957, Serial No. 655,681

9 Claims. (Cl. 115—1)

The present invention relates to track laying amphibious vehicles and more particularly to improved water propulsion means for such vehicles.

Amphibious vehicles of the track laying type are intended primarily for use on land, however, for specialized applications it is important that they be capable of propulsion in water. An example of vehicles of this type is the U.S. Army Weasel.

Such vehicles are usually quite heavy and have their water line just below the deck of the vehicle so that its tracks are completely submerged. Due to weight limitations, elaborate mechanisms for propulsion through water cannot be provided, therefore, the driving movement of the vehicle's tracks is the sole means for marine propulsion. Vehicle movement in water is caused by a differential in reaction forces created between the submerged upper and lower halves of the moving track.

It is apparent that the upper half of the track is moving through the water in a direction contrary to that of the lower half and against the water. Because the entire track is submerged, the differential in forces caused by the two halves of the track is very slight. The inefficiency of this arrangement is evidenced by the fact that a track speed which would propel such a vehicle on land at a speed of 35 to 40 miles per hour might cause it to move at only 1 to 2 miles per hour in the water.

In view of the foregoing state of the art, it is an object of the present invention to provide an improvement in conventional track laying amphibious vehicles whereby the effciency of the vehicle's marine propulsion means is increased.

It is a further object of the present invention to provide means in such a vehicle for spoiling the retarding effect of the upper half of the track as it moves through water.

These and further objects of the present invention will become apparent from the following description and the accompanying drawings in which.

Figure 1:
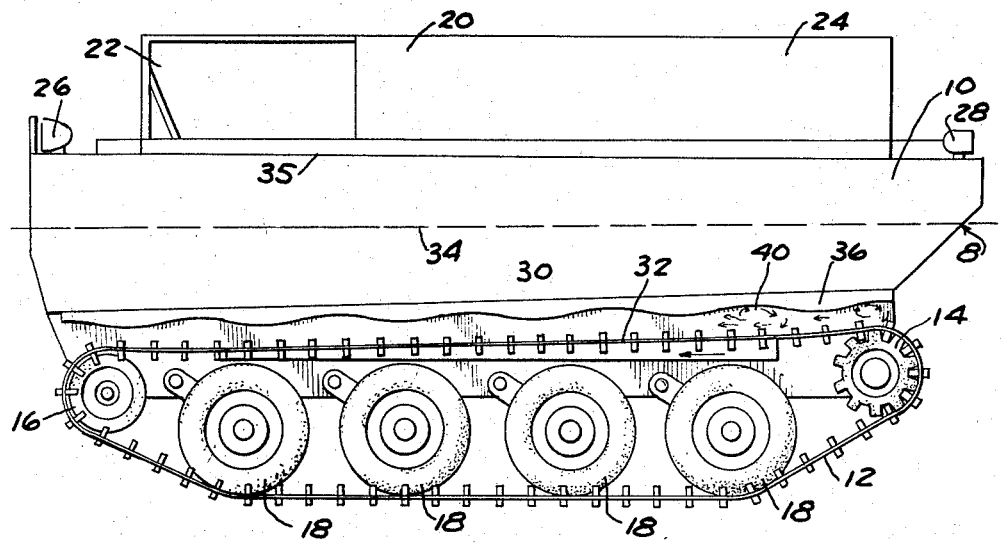
Figure 1 is a side elevational view of an amphibious track laying vehicle incorporating the invention of this application.

Referring now to the drawing for a more detailed description of the present invention, Figure 1 discloses a side elevational view of an amphibious track laying vehicle indicated generally as 8, having a watertight hull 10 mounted on ground engaging tracks 12. The tracks 12 are propelled by driving sprockets 14 which in turn are connected to the vehicle's prime mover. The tracks 12 are supported by and engage driven wheels 16 and bogey wheels 18. The hull 10 is provided with a cab 20 having a forward operator's position 22 and a cargo portion 24. Headlamps and tail lights are indicated at 26 and 28 respectively.

When the vehicle is propelled on the ground in a forward direction the driving sprocket 14 forces the track 12 to rotate in a counterclockwise direction as seen in Figure 1, resulting in the lower half of the track 12 to move to the right and the upper half to the left.

The hull 10 is generally T-shaped in cross section, having sponsons 30 which extend on the sides thereof and over the tracks for buoyancy. When the vehicle 8 is in water it will float on a water line 34 just below the deck surface 35. The high net vehicle weight, due to its primary application as a land vehicle, accounts for the little freeboard. Because the entire track is submerged propulsion can only be achieved by a differential in reaction forces created at the upper and lower halves of the track 12 as it travels through the water. Even at high track speeds the force differential is quite small and the resulting water speed is therefore extremely slow.

According to the present invention, spoiler means are provided in such a vehicle which will reduce the negative reaction forces created by movement of the upper half of the track 12 through the water. For this purpose spoilers 36 are secured longitudinally of the vehicle 8 directly below the sponson 30 and above the upper half of the track 12.

In the preferred form of this invention, as disclosed in Figure 1, the lower side of the spoiler 36 presents an undulating surface toward the track 12 and spaced apart therefrom. The waves of the undulating surface extend transverse to the direction of movement of the track 12.

In operation, water carried by the upper half of the track will follow a path as indicated by the arrows 40. Because of the irregular shape of the spoiler 36, the water carried by the upper half of the track 12 will pass through restricted and open portions alternately thus becoming turbulent destroying the effectiveness of that portion of the track's propulsion capabilities. The eddy currents created will react in a direction against the flow of water carried by the track's upper portion. Thus the spoiler 36 increases the differential of forces created in the water between the upper and lower halves of the track 12 by reducing the effective forces of the upper half. Due to the increase in differential the forces tending to cause the vehicle to move will be likewise increased.

Figure 2:
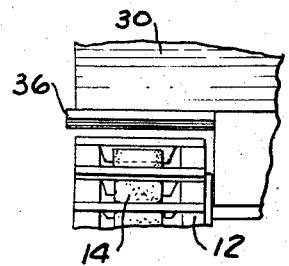
Figure 2 is a partial rear elevational view of the vehicle disclosed in Figure 1.
Figure 3:
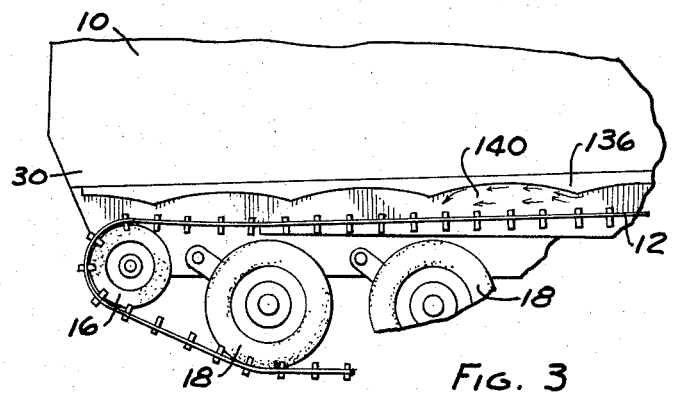
Figure 3 is a partial side elevational view disclosing a modified form of the invention in Figure 1.
Figure 4:
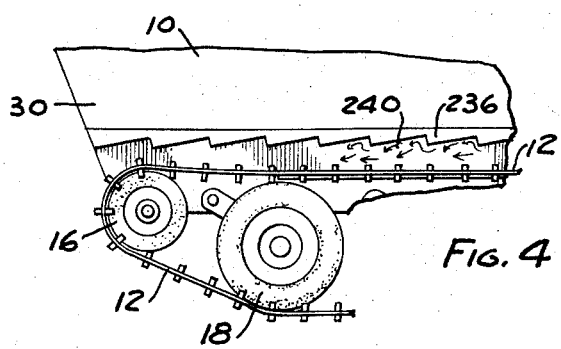
Figure 4 is a partial side elevational view of a further modification of the invention disclosed in Figure 1.

Modified forms of the spoiler 36 shown in Figures 1 and 2 are disclosed in Figures 3 and 4. These latter spoilers operate on the same principles as that just described. In Figure 3 spoiler 136 is located longitudinally of the vehicle and presents an irregular surface having relatively peaked ridges or rippled surface facing the upper half of the track 12. In Figure 4 the spoiler 236 presents a saw-tooth configuration toward the track 12. In both cases the raised portions run transverse to the track. Arrows 140 and 240 indicate the general path of the water carried by the upper half of the track 12 as it moves in a forward direction. In both of these modifications eddy currents and turbulence will be created tending to destroy the effectiveness of the upper half of the track 12 as a water propulsion means.

The foregoing description is presented as the preferred form of the invention. It is contemplated that other spoiler shapes may be created within the scope and spirit of the present invention.

I claim:

1. In an amphibious track laying vehicle having a water-tight hull, longitudinal sponsons extending outwardly from the sides of said hull, power driven endless tracks disposed on the longitudinal sides of said vehicle and beneath said sponsons, spoiler means spaced apart from said tracks, said means having surfaces with raised portions transverse to said tracks and creating restricted openings between the working surfaces of said track and said surfaces.

2. In an amphibious track laying vehicle having a water-tight hull, said hull having sponsons extending outwardly from the longitudinal sides of said vehicle, power driven endless tracks disposed on either side of said vehicle and beneath said sponsons, spoiler means located between said sponsons and the working surfaces of said tracks, said means having longitudinal undulating surfaces spaced apart from and facing said tracks, and said undulating surface being substantially as wide as the width of the working surface of said tracks.

3. In an amphibious track laying vehicle having a water-tight hull, said hull having sponsons extending outwardly from the longitudinal sides of said vehicle, power driven endless tracks disposed on either side of said vehicle and beneath said sponsons, spoiler means located between said sponsons and the working surfaces of said tracks, said means having surfaces spaced apart from said tracks, said surfaces having transverse parallel rows of inclined planes juxtaposed the working surfaces of said tracks.

4. In an amphibious track laying vehicle having a water-tight hull, said hull having sponsons extending outwardly from the longitudinal sides of said vehicle, power driven endless tracks disposed on either side of said vehicle and beneath said sponsons, spoiler means located between said sponsons and the working surfaces of said tracks, said means having surfaces spaced apart from said tracks, said surfaces having transverse parallel rows of inclined planes juxtaposed the working surfaces of said tracks.

5. In an amphibious track laying vehicle having a water-tight hull, said hull including sponsons extending outwardly from the longitudinal sides of said vehicle, power driven endless tracks disposed on either side of said vehicle and beneath said sponsons, spoiler means located between said sponsons and said tracks, said means having surfaces spaced apart from said tracks, said surfaces having depending parallel rows of raised portions directed toward said tracks, said rows being perpendicular to the plane of rotation of said tracks.

6. The combination of claim 5 wherein said raised portions have a generally saw-tooth shape in longitudinal section.

7. The combination of claim 5 wherein said parallel rows of raised portions constitute undulate surfaces.

8. A track-laying vehicle having power-driven endless tracks disposed along its longitudinal sides, spoiler means located above said tracks, each of said means comprising an extended surface having in series a plurality of depending portions in close proximity to and transverse of the working surface of said tracks.

9. A vehicle having a road track disposed on at least one side thereof, a continuous irregular surface positioned relative to said track so as to provide a longitudinal series of alternately restricting and nonrestricting clearances between said surface and said track, and said surface being substantially as wide as the working surface of said track.

References Cited in the file of this patent

UNITED STATES PATENTS

| | | |
|---|---|---|
| 2,404,489 | Hait | July 23, 1946 |
| 2,456,542 | Swennes | Dec. 14, 1948 |

UNITED STATES PATENT OFFICE
CERTIFICATE OF CORRECTION

Patent No. 2,914,017                                                    November 24, 1959

Robert D. Ruger

It is hereby certified that error appears in the printed specification of the above numbered patent requiring correction and that the said Letters Patent should read as corrected below.

Column 1, line 44, for "effciency" read -- efficiency --; column 3, line 22, for "inclined planes" read -- raised ripples --.

Signed and sealed this 24th day of May 1960.

(SEAL)

Attest:

KARL H. AXLINE

Attesting Officer

ROBERT C. WATSON
                                                                     Commissioner of Patents